April 8, 1958 W. CARANGELO 2,829,387

AUTOMATIC SCREW SLOTTING AND DEBURRING MACHINE

Filed Sept. 21, 1953 6 Sheets-Sheet 1

INVENTOR
William Carangelo
BY
Nathaniel Frucht
ATTORNEY

AUTOMATIC SCREW SLOTTING AND DEBURRING MACHINE
Filed Sept. 21, 1953 6 Sheets-Sheet 2
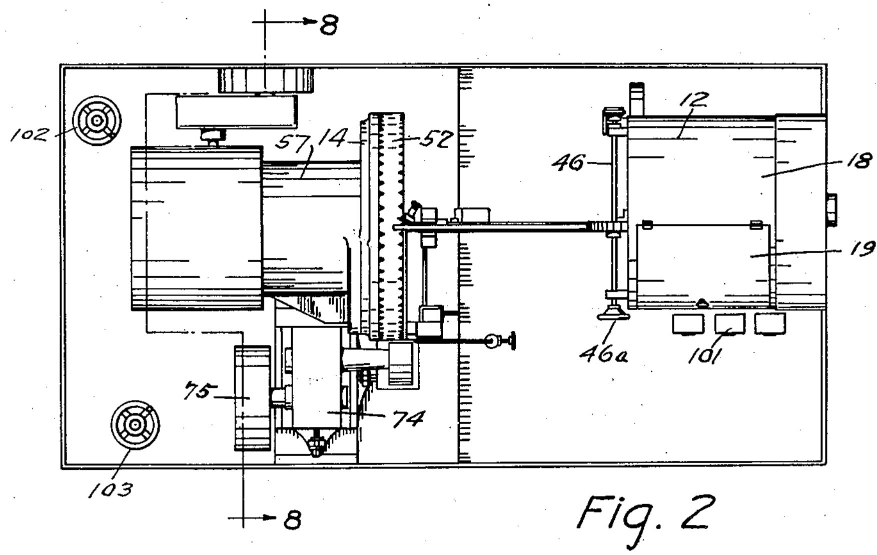
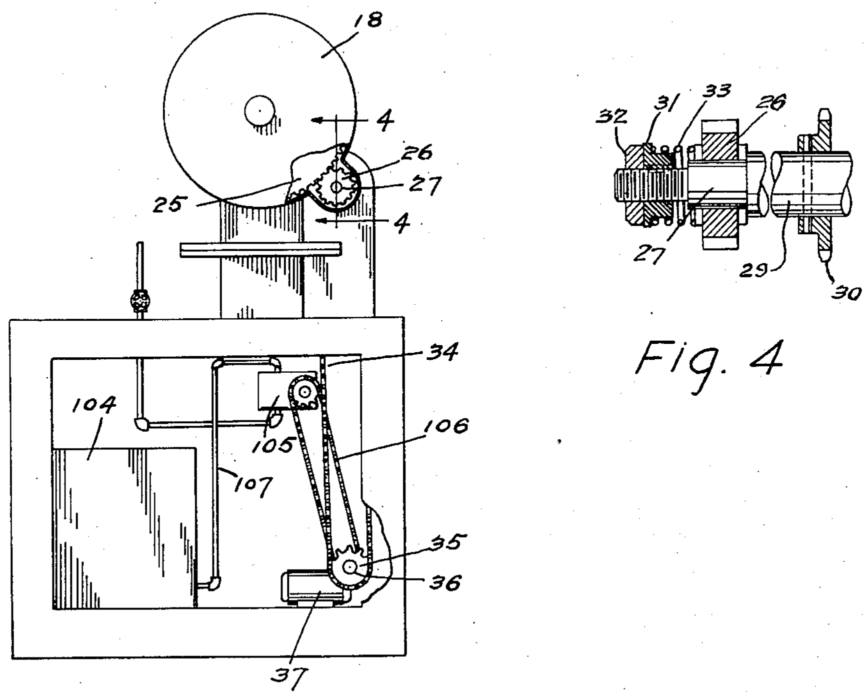
Fig. 3
INVENTOR
William Carangelo
BY Nathaniel Frucht
ATTORNEY April 8, 1958 W. CARANGELO 2,829,387
AUTOMATIC SCREW SLOTTING AND DEBURRING MACHINE
Filed Sept. 21, 1953 6 Sheets-Sheet 3
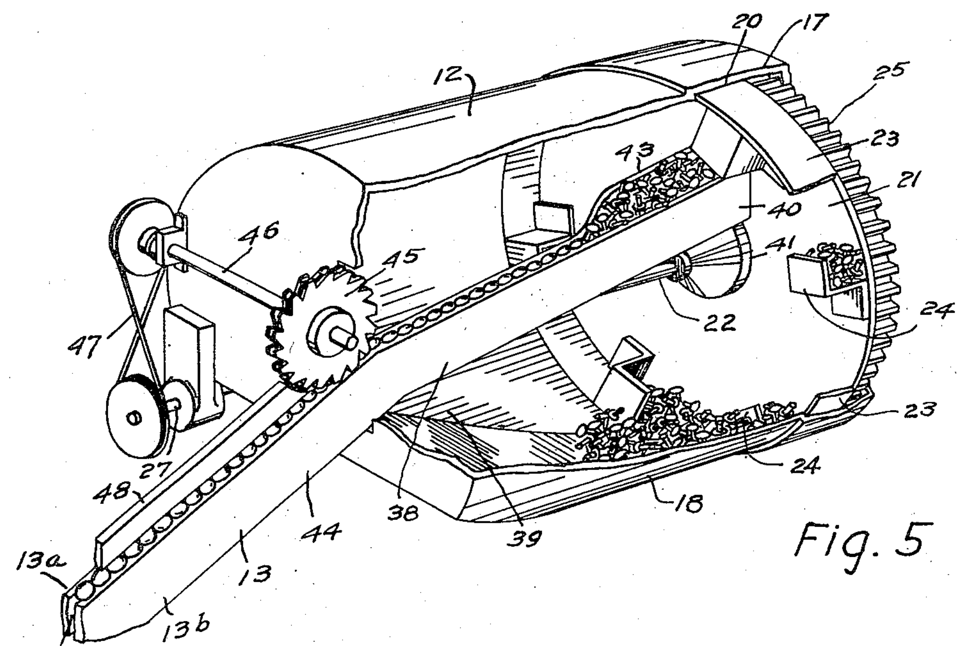
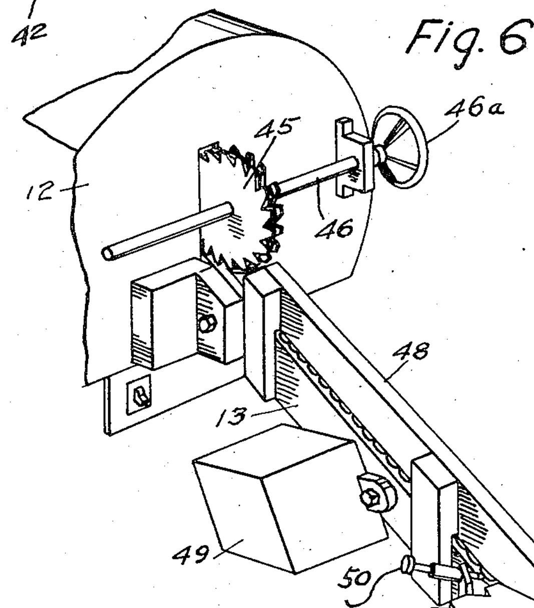
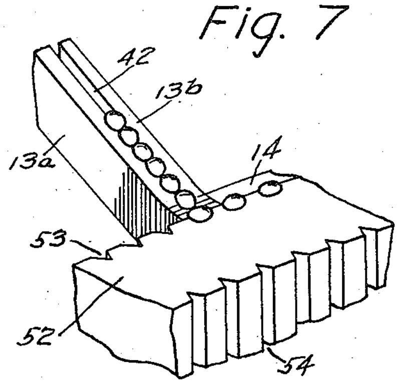
INVENTOR
William Carangelo
BY
Nathaniel Frucht
ATTORNEY

AUTOMATIC SCREW SLOTTING AND DEBURRING MACHINE

INVENTOR
William Carangelo
BY Nathaniel Frucht
ATTORNEY

April 8, 1958 W. CARANGELO 2,829,387
AUTOMATIC SCREW SLOTTING AND DEBURRING MACHINE
Filed Sept. 21, 1953 6 Sheets-Sheet 5
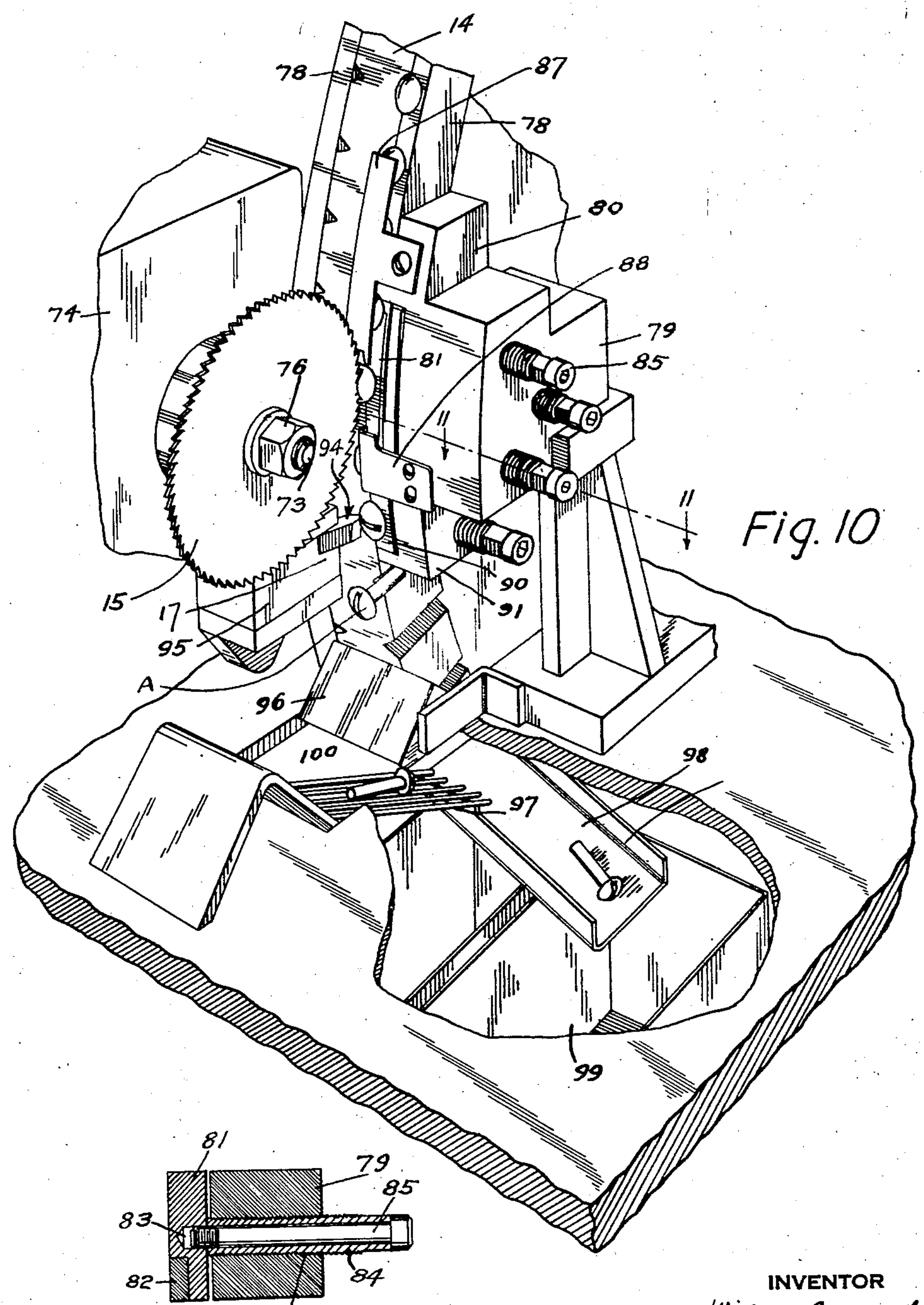
INVENTOR
William Carangelo
BY
Nathaniel Frucht
ATTORNEY April 8, 1958 W. CARANGELO 2,829,387

AUTOMATIC SCREW SLOTTING AND DEBURRING MACHINE

Filed Sept. 21, 1953 6 Sheets-Sheet 6

INVENTOR
William Carangelo
BY Nathaniel Frucht
ATTORNEY

United States Patent Office 2,829,387

Patented Apr. 8, 1958

1

2,829,387

AUTOMATIC SCREW SLOTTING AND DEBURRING MACHINE

William Carangelo, Pawtucket, R. I., assignor to Pawtucket Screw Co., a corporation of Rhode Island Application September 21, 1953, Serial No. 381,291

1 Claim. (Cl. 10—6)

The present invention relates to automatic screw slotters and has particular reference to a novel machine construction for automatically slotting the head of a screw blank and removing the resulting burr therefrom.

The principal object of the invention is to provide a screw slotting machine which receives unslotted screw blanks and automatically performs the operations of aligning, slotting, deburring and depositing the finished screws into a storage receptacle.

Another object of the invention is to provide an automatic screw slotting machine having a work carrier which receives screw blanks for slotting in set position from a work carrying runner.

A further object of the invention is to provide an automatic screw slotting machine having a revolving work carrier and an attachment for locking blanks in position for slotting which includes a deburrer knurl block.

An additional object of the invention is to provide an automatic screw slotting machine having a revolving work carrier and a synchronized revolving slot cutting saw with safety features for preventing breakage.

Another object of the invention is to provide an automatic screw slotting machine having a revolving work carrier, with mechanism for reversing the mechanism to eliminate jamming.

A further object of the invention is to provide an automatic screw slotting machine having a deburrer tool with a slot guide mechanism to time and to set the slotted screw blank for the deburring operation.

Still another object of the invention is to provide an automatic screw slotting machine having a rotating reversible work carrier which is adapted to be selectively used for two different sizes of screws.

A futher additional object of the invention is to provide an automatic screw slotting machine having a rotating work carrier and a slot cutting saw which are coordinately operated with variable speed drives.

With the above and other objects and advantageous features in view, the invention consists of a novel arrangement of parts and a novel method of operation, more fully disclosed in the detailed description following, in conjunction with the accompanying drawings, and more specifically defined in the claim appended thereto.

In the drawings,

Fig. 2 is a top plan view thereof;

Fig. 3 is a view of one end thereof, parts being broken away;

Fig. 4 is an enlarged section on the line 4—4 of Fig. 3;

Fig. 5 is an enlarged perspective view of the hopper and its associated parts, partly broken away;

Fig. 6 is a perspective view of the runner and its associated parts, partly broken away;

Fig. 7 is an illustrative view of the runner and the work carrier, parts being broken away, showing the sequential transfer of screws from the runner to the carrier;

2

Figure 8:
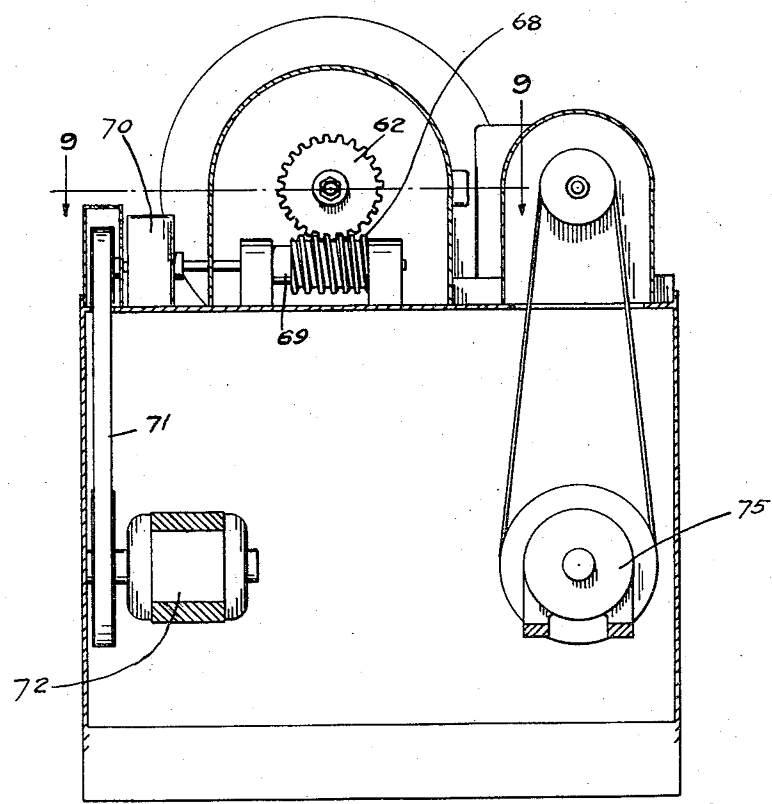
Figure 9:
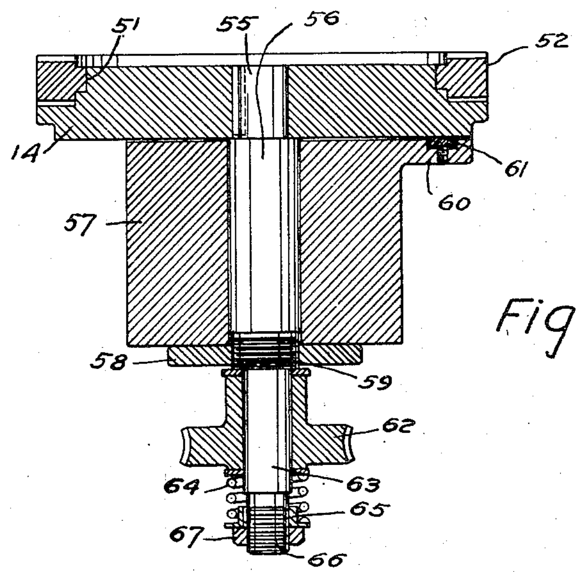
Figure 12:
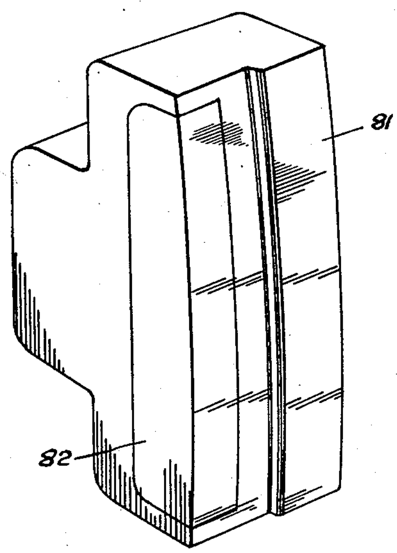
Figure 13:
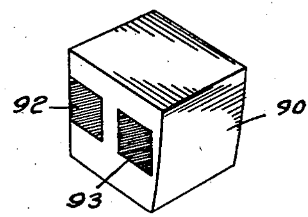

Fig. 8 is a view of the other end of the screw slotting machine, parts being removed to disclose the interior;

Fig. 9 is an enlarged section on the line 9—9 of Fig. 8;

Fig. 10 is a perspective view, parts being broken away and other parts being omitted, showing the parts in slot cutting and deburring positions;

Fig. 11 is an enlarged section on the line 11—11 of Fig. 10;

Fig. 12 is an enlarged perspective view of the work lock holder;

Fig. 13 is an enlarged perspective view of the deburrer knurl block; and

Figure 14:
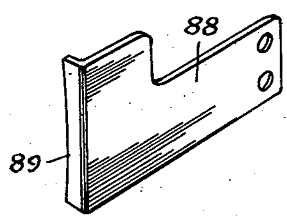

Fig. 14 is an enlarged perspective view of the slot guide.

It has been found advisable to devise an automatic screw slotting machine for slotting and deburring unslotted screw blanks. To this end, I provide a drum bucket hopper for receiving a supply of unslotted screw blanks, a runner which receives and aligns the unslotted screw blanks from the hopper in sequence, a rotary work carrier which has notches for receiving the aligned screw blanks from the runner in set position, a revolving saw for slotting the screw blank heads, a knurl block for guiding the slotted screw blanks into position for deburring, and a deburring cutter for deburring the slotted screw blanks, the finished screw blanks and the chips then passing separately to passageways for storing in separate receptacles.

Figure 1:
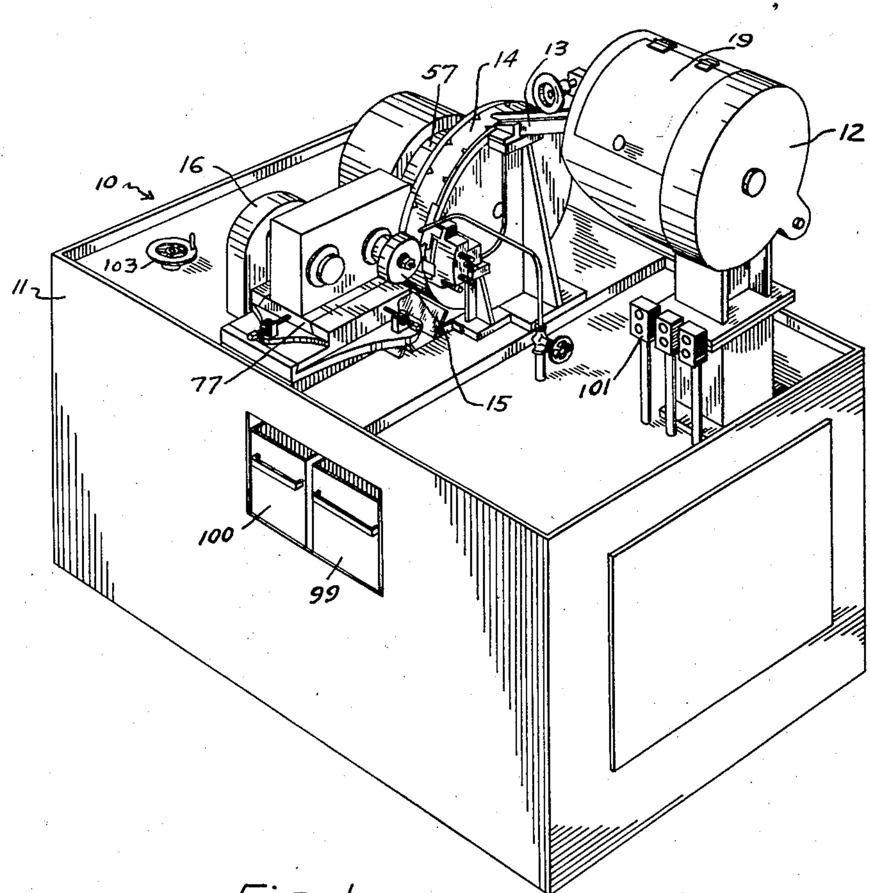
Fig. 1 is a perspective view of a preferred embodiment of the novel automatic screw blank slotting machine.

Referring to the drawings, Fig. 1 discloses a preferred construction of an automatic screw slotting machine 10, which includes a base 11 on which a drum bucket hopper 12, a runner 13, a rotary work carrier 14, a revolving saw 15, a knurl block device 16, and a deburring cutter 17 are mounted.

*The drum bucket hopper*

The drum bucket hopper 12, see Fig. 5, has a stationary generally cylindrical housing 18 having a hinged work feed door 19 and a downwardly tapering lower portion leading to an annular enlarged gear recess 20 at one end, in which a circular plate 21 is rotatably mounted on a fixed shaft 22. The plate 21 carries a circular flange 23 with a series of spaced work lifting angle iron buckets 24 on its inner face, and an annular ring gear 25 on its outer face, the ring gear 25 being frictionally driven by a pinion 26, see Fig. 4, mounted to a cross shaft 27 transversely positioned at one side of the hopper, the pinion being housed in a chamber formed as an extension of the annular gear recess 20. The shaft 27 has a portion 29 with a sprocket gear 30 rotatably mounted thereon; a bushing 31 is keyed to the shaft end and held in place by a lock nut 32, the bushing bearing against one end of a compression spring 33; the other end of the spring 33 engages the hub of the pinion 26, whereby the pinion normally rotates with the shaft 27 but does not rotate if there is work jamming in the hopper. The shaft 27 is driven by a chain 34 from a sprocket gear 35 on the power shaft 36 of a motor 37, see Fig. 3.

*The runner*

The runner 13, see Figs. 5, 6 and 7 consists of two guide pieces 13*a*, 13*b*, which are adjustably spaced for different size screw blanks, with a gently downwardly sloping upper portion 38 extending through an opening in the front end 39 of the hopper, and terminating adjacent the rotary plate 21, the upper end 40 of the runner being supported on a disk 41 mounted on the fixed shaft 22, its groove 42 having an enlarged portion is illustrated at 43 to receive unslotted screw blanks from the buckets 24, the enlarged portion merging into the groove 42 to align the unslotted blanks in sequence with their shanks within the groove and their heads riding on the sides of the groove. The lower portion 44 of the runner slopes more sharply downwardly, and a kick out or knock out wheel 45 engages the heads of the unslotted blanks descending in the runner, to displace any blanks not properly aligned therein, the wheel 45 being keyed to a stub shaft 46 which is belt driven from the shaft 27 as indicated at 47 in Fig. 5 and has a hand wheel 46a at one end thereof. A retainer block 48 is mounted over the runner to keep the unslotted blanks in line in the runner groove, and a power vibrator 49 is secured to the side of the runner to provide continual vibration for ensuring downward flow of the aligned unslotted blanks. A manually movable stop 50 is mounted on the lower end of the runner, see Fig. 6, which may be pushed across the lower end of the groove 42 to stop downward movement of the unslotted blanks.

*The rotary work carrier*

The rotary work carrier 14, see Figs. 2, 6 and 7 and 9, is preferably of the disk type, with an annular recess 51 for detachably receiving a ring 52 having spaced radial screw blank retaining grooves 53 on one side for receiving unslotted screw blanks of one size, and spaced radial retaining grooves 54, on the other side adapted to receive unslotted screw blanks of a different size. The carrier 14 is keyed to the reduced end 55 of a carrier shaft 56, see Fig. 9, and is engaged by a hub 57 rotatably mounted on the shaft 56 and pressed inwardly by an adjustment washer 58 threaded on a threaded section 59 of the shaft, the hub 57 having an arm 60 with a friction knob 61 which serves to steady the carrier in its rotation. A worm gear 62 is rotatably mounted on a reduced portion 63 of the carrier shaft, and is frictionally connected to the carrier shaft through a compression spring 64 and a bushing 65 which is keyed to a threaded end portion 66 of the shaft and is held in place by a lock nut 67.

The worm gear 62 is driven by a worm wheel 68, see Fig. 8, on a worm shaft 69 which is power driven through a reduction gear 70, belt driven as indicated at 71 by a motor 72.

*The revolving saw and its associated parts*

The revolving saw 15, see Fig. 10, has a guard, and is keyed to a stub shaft 73 and is belt driven through a gear box 74 from a motor 75. The saw is slidable on the shaft 73 and is locked in place by retaining washers and a lock nut 74, and is slidably adjustable for centralizing and controlling the depth of the slot by a saw adjusting centering unit 77, whereby accurate alignment with the center line of the unslotted screws on the carrier is established, the screw blanks being held in place by fixed arcuate guide rails 78.

A clamp element 79 is mounted adjacent the saw, see Fig. 10 with an upper portion 80 set against the lower edge of the work carrier guide rail, and includes an adjustable inset lock block 81, see Figs. 11, and 12, which has a carbon wear tip 82. The lock block 81 is normally in spaced relationship to the clamp element 79, see Fig. 11, and has recesses 83, being shown in Fig. 11, for rereceiving the ends of the adjusting screws 85, which are received within sleeves 84 threaded through bores 86 in the clamp element, the screws 84 providing both vertical and horizontal adjustment, whereby correct alignment of the lock element is obtained. A metal T-shaped holder 87, see Fig. 10, is mounted on the clamp element and extends over the unslotted screw blank heads to keep them down, the inset block 81 pressing against the sides of the screw blanks and keeping them locked in place as they are engaged and slotted by the saw.

The slotted screw blanks, as they leave the saw, are engaged by a guide plate 88, see Fig. 14, having a narrow flange 89, the edge of the flange 89 entering and extending through the sawed slots to keep the slots in a vertical plane. As the carrier rotates and each slotted screw blank passes from the flange 89, it is engaged by a knurled block 90, see Figs. 10 and 13, which is adjustably mounted in the lower extension 91 of the clamp element and has an adjusting means similar to that shown in Fig. 11, with surface knurls 92, 93, whereby the slotted screw blank is rotated slightly more than 90 degrees to bring the saw burr at the end of the slot against a burr removing tool 94 mounted in an adjustably fixed support 95, whereby the slot is deburred.

As the carrier continues its rotation, the head of the deburred slotted screw contacts an inclined plate 96, and the finished screw blank falls out of the carrier groove, which has passed beyond the tool holder, and onto an inclined grill work 97 for deflection to a work chute 98 and to a container bin 99. The chips resulting from the saw action and the deburring action pass through the grill work 97 to fall into a scrap bin 100.

The controls for the motors are shown in Fig. 1, and include switches 101 with buttons for starting, for reversing, and for stopping, a variable speed controller 102 for the work carrier and a variable speed control 103 for the saw also being provided. Fluid coolant circulation for the saw is provided by a fluid pressure supply tank 104, see Fig. 3, pump 105 driven by chain drive from the shaft 36, and valve controlled piping 107.

The operation of the novel screw head slotting machine is now clear. The hopper is filled with unslotted screw blanks, which pass to the lower end and are fed upwardly by the rotating buckets to fall into the enlarged end of the runner. The screw blanks are aligned in the runner, with their heads exposed and their bodies in the runner groove, and slide down to be successively fed into the carrier grooves, in which they are held by the contiguous side rail. As the carrier revolves, the screw blank heads are kept in place by the work holder and kept locked by the lock block until the screw blank heads are slotted by the saw, whereupon the guide plate flange enters the slot to keep the screw blank head vertical until the screw is turned 90 degrees by the knurled block into position for deburring, deburring taking place on a slight further rotation of the carrier. The deburred slotted screw blanks are then separated from the burr chips and are guided to a container bin.

Although I have described a specific constructional embodiment of my invention, it is obvious that changes in the size, shape, and arrangement of the parts may be made to meet different slotting requirements, without departing from the spirit and the scope of the invention as defined in the appended claim.

I claim:

In a screw slotting machine, a hopper for unslotted screws, an inclined guideway adapted to receive unslotted screws in sequence from the hopper, a rotary carrier having a face substantially at right angles to said guideway, means in said face for receiving the screw blanks directly from said guideway and retaining them in a radial position with their head portions outwardly disposed, means for continuously rotating said rotary carrier to progressively advance the screw blank, a clamp element positioned adjacent said face having a lock block adapted to temporarily secure said screw blank against said face, a cutter adjacent said lock block adapted to slot the head of the secured screw blank, means carried by said clamp element adjacent said cutter for interengaging with the slotted screw to maintain the latter against rotation for a predetermined time interval, additional means carried by said clamp element for imparting slightly more than ninety degrees rotation to the slotted screw upon its release from said interengaging means, and a deburring element positioned adjacent said additional means and adapted to deburr the slotted screw during the rotation thereof, said interengaging means comprising a fixed flange which extends into the slotted heads of the screws.

References Cited in the file of this patent

UNITED STATES PATENTS

| | | |
|---|---|---|
| 1,153,540 | Carpenter | Sept. 14, 1915 |
| 1,931,699 | Hubbell | Oct. 24, 1933 |
| 2,621,343 | Fray | Dec. 16, 1952 |
| 2,642,594 | Fray | June 23, 1953 |
| 2,737,669 | Schaeffer | Mar. 13, 1956 |

FOREIGN PATENTS

| | | |
|---|---|---|
| 512,126 | Belgium | July 15, 1952 |